March 13, 1945.  S. T. LESTER  2,371,302
MEASURING APPARATUS
Filed June 5, 1942
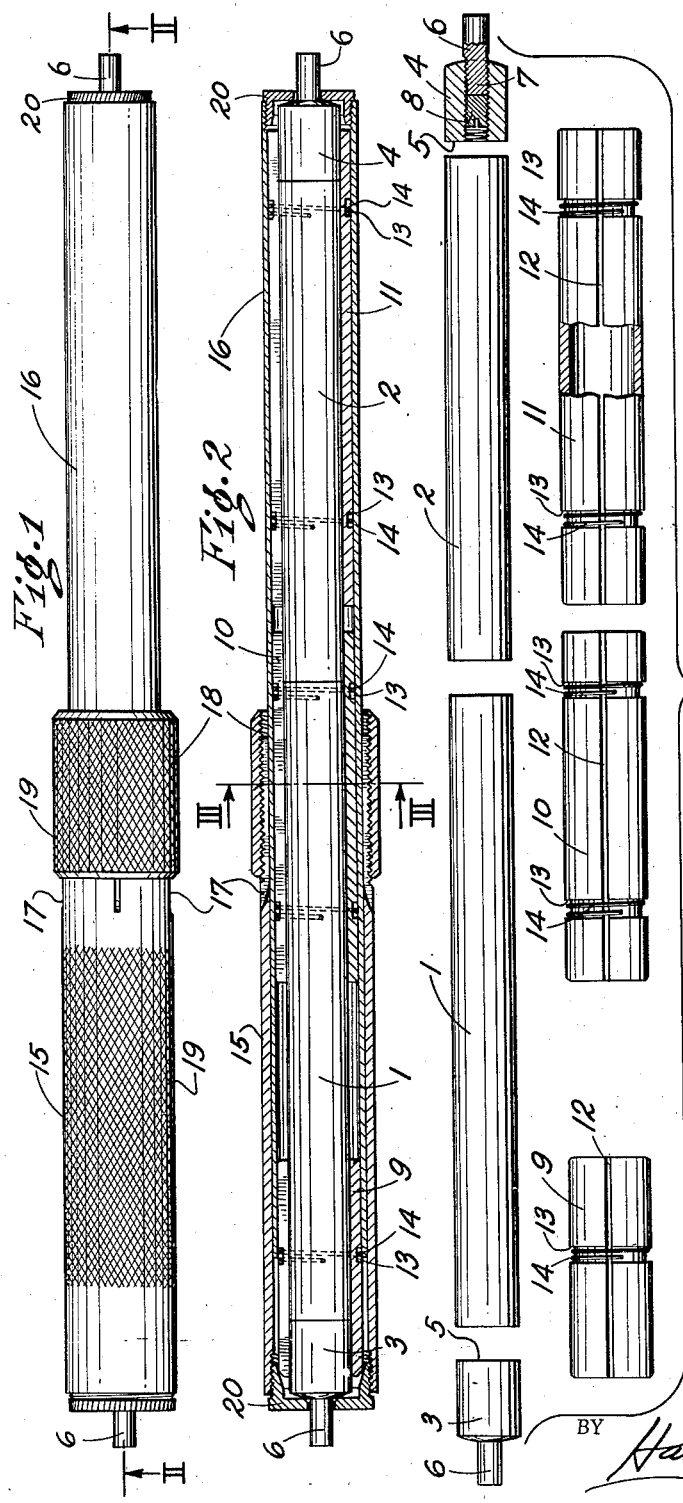
INVENTOR.
Stephen T. Lester
BY
Hawgood and Van Horn
ATTORNEYS Patented Mar. 13, 1945

2,371,302

UNITED STATES PATENT OFFICE 2,371,302

MEASURING APPARATUS

Stephen T. Lester, Cleveland Heights, Ohio

Application June 5, 1942, Serial No. 445,876

5 Claims. (Cl. 33—168)

This invention relates to measuring apparatus and particularly to apparatus intended for the extremely accurate measurement or gaging of articles.

An object of the invention is to provide an improved measuring apparatus with which any of a large number of measurements may be obtained with extreme accuracy.

Another object is to provide an improved measuring apparatus which may easily be arranged to provide any desired measurement.

Another object is to provide an improved measuring apparatus which will consist of few and simple parts.

Another object is to provide an improved measuring apparatus which will be small and may easily be handled.

Another object is to provide an improved measuring apparatus which will not be affected by handling.

Another object is to provide an improved measuring apparatus in which maximum number of measurements may be obtained with a minimum number of parts.

Another object is to provide an improved measuring apparatus in which all the parts will be of substantial size and therefore convenient in manufacturing and handling.

Another object is to provide an improved measuring apparatus in which the accuracy is dependent on the parts chosen, rather than upon adjustments.

Another object is to provide an improved measuring device in which an adjustable measuring device may readily be associated with an extension providing a predetermined and extremely accurate base reading.

Another object is to provide an improved measuring device which may be provided with an extension which may readily be adjusted to any of a plurality of extremely accurate base readings.

Other objects will hereinafter appear.

Figure 1 is a side elevational view of an assembled gage embodying the present invention;

Figure 2 is a longitudinal sectional view taken on the line II—II of Figure 1;

Figure 3 is a transverse sectional view taken on the line III—III of Figure 2;

Figure 4 is a disassembled view, parts being broken away and shown in section, of some of the components of Figures 1 to 3; and Figure 5 is a fragmentary elevational view of an adjustable measuring device associated with parts disclosed in the preceding figures.

This application is a continuation, in part, of my former application, Serial Number 234,665, filed October 12, 1938.

In the measuring apparatus disclosed, very accurate measurements are obtained by the use of a series of gage blocks having parallel plane end surfaces which are carefully and accurately finished, as by being lapped or otherwise, so that these surfaces not only conform very closely to true theoretical planes in exact parallelism, but are at very accurately determined distances.

In practice, these surfaces so nearly conform to a true theoretical plane that the gage blocks may be secured together by being "wrung" together, that is, by the surfaces of adjacent blocks being slid laterally upon each other to exclude any air from between their surfaces, so that atmospheric pressure on the other parts of the blocks holds them together.

In Figures 2 and 3 of the drawing, two gage blocks 1 and 2 having parallel plane end surfaces are illustrated, these blocks being of cylindrical shape with their plane surfaces normal to the axes of the cylinders.

In addition to the blocks having opposed plane end surfaces, there are illustrated two end blocks 3 and 4, each of which has one plane end surface 5 and at its opposite end is provided with a contacting anvil 6. The end surfaces of these anvils may be plane or convex, and are spaced at predetermined distances from the surfaces 5 of the end blocks.

For adjustment, the anvils are threaded, as indicated at 7, into the end blocks, being secured in adjusted position by lock screws or threaded plugs 8, likewise threaded into the axial openings through the end blocks. It will be apparent that, by backing off the lock screw 8, the anvil 6 may be simply adjusted by turning the same relative the block, and it then may be easily locked in its newly adjusted position by tightening the lock screw tightly against its end.

The blocks intermediate the end blocks will hereinafter be referred to as "cylindrical blocks," because there is no need of varying their cross sectional shape through their extent. Although these blocks have been shown as circular in cross section, it will be understood that they might, if desired, be elliptical cylinders, or of prismatic shape, or other forms, but the circular form shown is one of the most convenient and is the one which is now being used exclusively.

It will be also understood that the blocks 1 to 4 are only part of a series which may comprehend as many blocks as desired, which may be of identical lengths, or different lengths in any desired series of increments.

For instance; a series of fifteen blocks each of a length of one-inch might be used, or a series of four blocks comprising one of a length of one one-inch, one of two-inch length, one of four-inch, and one of eight-inch will permit arrangements of blocks giving measurement by one-inch intervals from one to fifteen inches.

If half inch intervals are desired, the above set need be augmented by only a single half-inch block.

For another example; with only five end blocks and thirty-three cylindrical blocks, I can obtain all measurements from 2.4005 inches upwardly to twenty-two inches inclusive, in steps of .00025 inch. The blocks constituting this set comprise two end blocks each measuring exactly one inch in length, a third end block measuring .995 inch, a fourth of 1.0025 inches, and a fifth of 1.005 inches.

The cylindrical blocks of this set are most simply considered as divided into four series. The first of these series includes nine blocks which, measured across their plane end surfaces, are in length, respectively, .100, .200, .300, .400, .500, .600, .700, .800, and .900 inch.

The second series consists of nine more blocks, measuring, respectively, across their plane surfaces .201, .202, .203, .204, .205, .206, .207, .208, and .209 inch.

The third series consists of another nine blocks, of the respective lengths of .210, .220, .230, .240, .250, .260, .270, .280, and .290 inch.

The remaining series consists of six blocks which measure, respectively, one, two, three, four, five, and six inches.

If, for example, it is desired with this set of blocks to measure a distance of 5.60675 inches; it is only necessary to assemble the end blocks measuring .9995 and 1.00025 inches with the three inch block, the .400 inch block and the .207 inch block.

If a quarter of a thousandth more is required, the 1.0005 inch end block is substituted for 1.00025 inch. If a quarter of a thousandth less is desired, one of the one inch blocks is substituted for the 1.00025 inch, so that it will be apparent that dimensions in quite odd decimal fractions may readily be obtained with this small number of blocks.

It is also apparent that no block is less than .100 inch in thickness, and only one is less than .200 inch, so that all are large enough for convenient handling.

While the blocks could be used alone, merely being held together by atmospheric pressure, considerable care must be exercised in using them in this manner, as they may be jarred apart, or subjected to temperature variations when held in the hand, and in general, are exposed to wear, dirt, moisture, and the like, and it has been found desirable to assist the atmospheric pressure by providing a protecting and handling covering, preferably one which is composed of a non-magnetic material which is also an insulator against both heat and electricity, such, for instance, as hard rubber, molded plastic, vulcanized fiber, and the like.

This covering consists of a series of sleeves 9, 10 and 11, which are slotted lengthwise, as indicated at 12, to permit the edges to be somewhat sprung apart on being put over the blocks, so that the sleeves will fit tightly over the same. To assist in this gripping action, each sleeve is shown as being formed with one or more annular recesses 13, in which recesses are positioned small circular wire springs 14 which tend to contract the sleeves and augment their gripping action.

The slotted sleeves are, in turn, surrounded by two telescopic tubular members 15 and 16.

The outer end of the outer tubular member 15 is slotted as indicated at 17, at the end which embraces the inner tubular member 16, and exteriorly of this slotted portion is provided with a tapered thread engaging the conjugate internal thread of a cylindrical ring 18, so that by tightening the ring 18 upon the threads of tubular member 15, the furcations of the latter are clamped tightly upon the exterior of tubular member 16. For facilitating tightening and loosening these parts the exteriors of the tubular member 15 and the ring 18 are roughened or knurled as indicated at 19.

The outer end of each of the tubular members is internally threaded and provided with an externally threaded cap or plug 20, each cap or plug having a central aperture through which the anvil 6 of the adjacent end block may project.

The device is assembled as follows:

After the blocks aggregating any desired length have been chosen, these are "wrung" together and surrounded by a sufficient number of slotted sleeves (such as 9 to 11) so that these sleeves overlie each junction between the end surfaces of successive blocks.

The blocks and slotted sleeves are than slid within the tubular member 16 which loosely engages the exterior of the slotted sleeves, the tubular member 15 is then slid over the exposed end of the series of blocks, the tubular members 15 and 16 brought as tightly together as conveniently may be done by hand, and the ring 18 tightened upon the threads to clamp these tubular members together.

If additional pressure is desired upon the ends of the end blocks, one or both of the caps 20 may be tightened within its threads at the end of its tubular member.

In a sense, the connection between the tubular members constitutes a coarse clamping adjustment, and the adjustment of the plugs or caps a finer clamping adjustment.

With the blocks, slotted sleeves, and telescopic tubular members assembled as above outlined, the blocks are well protected and insulated against heat or electricity at all points, excepting the two exposed anvils 6, and the device may be jarred or dropped without displacing the blocks and is to all intents and purposes as unitary as would be a single purpose gage, made to the length to which it has been set.

It is no more bulky nor heavy than the conventional single-piece gage for a single measurement, and its accuracy is at least the equivalent of any other measuring standard, such as the more cumbersome rectangular blocks now in vogue.

However, when it is desired to change the gage to a different size, its comparatively few parts may be quickly and easily disassembled, and the gage shortened or lengthened by removal, insertion, or interchange of blocks, even for such small graduations that it may be quickly changed over to use for "go" and then for "no go" gaging.

In Figure 5, an internal micrometer head, indicated generally at 21, has been attached to the anvil 6 of one of the blocks of the gage described in the previous figures. The micrometer head is shown in the drawing as attached to the anvil by means of set screws 23 and 24 having knurled heads by which they may be moved manually.

This head, it will be understood, is adjusted so that the end of its anvil 22 is, when the head is set to zero reading, a predetermined distance from surface 5 of the end block, as, for instance, an even number of inches.

With this micrometer head or similar measuring device applied to the anvil, it will be apparent that adjustments within the range of the measuring device may readily be made without disassembling the device or changing the blocks, and that no blocks of dimensions within the range of the measuring device need be used. In other words, with a one inch micrometer head, blocks in multiples of one inch in length may be used, and all intermediate measurements obtained by adjustment of the head. This, of course, converts the gage into a simple, highly accurate and very efficient internal micrometer.

While I have described the illustrated embodiment of my invention in some particularity, obviously many others will readily occur to those skilled in this art, and I do not, therefore, limit myself to the precise details shown and described, but claim as my invention all embodiments, variations, and modifications thereof coming within the scope of the appended claims.

I claim:

1. A gage comprising a series of measuring blocks having accurately formed parallel surfaces at predetermined distances, a holder for said blocks comprising two telescopically arranged hollow members having openings at the ends through which portions of an end block may project, and means for clamping said telescopic members together at any desired telescoped position.

2. A gage comprising a series of measuring blocks having accurately formed parallel surfaces at predetermined distances, a holder for said blocks comprising two telescopically arranged hollow members having openings at the ends through which portions of an end block may project, means comprising a slotted end, a tapered external thread, and a ring having an internal tapered thread conjugate to said external thread, clamping said telescopic members together.

3. A gage comprising a series of measuring blocks having accurately formed parallel surfaces at predetermined distances, a holder for said blocks comprising two telescopically arranged hollow members having openings at the ends through which portions of an end block may project, and means for clamping said telescopic members together at any desired telescoped position, the remote ends of the telescopic members being threaded, and threaded perforated members engaging said threads, a portion of the end blocks being capable of extending through the perforations of said members.

4. A measuring device comprising a plurality of cylindrical blocks having parallel plane end surfaces at predetermined distances, a slit resilient sleeve frictionally engaging the cylindrical surface of said blocks, and a cover consisting of two relatively adjustable telescopic parts surrounding said blocks and sleeve.

5. A gage comprising a plurality of cylindrical blocks each having parallel plane end surfaces at a predetermined distance, the blocks being secured together axially by the bringing in contact of the plane end surfaces of successive blocks and excluding air from the space between said surfaces, and a cylindrical sleeve slidable axially over the assembled blocks and holding said blocks from radial displacement relative each other, said sleeve being composed of heat insulating material, projecting contacting tips on the end blocks of the series, and pressure applying means engaging said end blocks and retaining the sleeves against axial movement beyond the series of blocks.

STEPHEN T. LESTER.